United States Patent
Ogasawara et al.

(10) Patent No.: US 9,880,028 B2
(45) Date of Patent: Jan. 30, 2018

(54) ABSOLUTE ENCODER

(71) Applicant: CANON KABUSHIKI KAISHA, Tokyo (JP)

(72) Inventors: Makiko Ogasawara, Utsunomiya (JP); Takayuki Uozumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 14/754,921

(22) Filed: Jun. 30, 2015

(65) Prior Publication Data
US 2016/0003645 A1    Jan. 7, 2016

(30) Foreign Application Priority Data

Jul. 1, 2014   (JP) ................. 2014-136215

(51) Int. Cl.
| | |
|---|---|
| G01D 5/24 | (2006.01) |
| G01D 5/347 | (2006.01) |
| G01D 5/244 | (2006.01) |
| G01D 5/245 | (2006.01) |

(52) U.S. Cl.
CPC ....... *G01D 5/34784* (2013.01); *G01D 5/2455* (2013.01); *G01D 5/24461* (2013.01); *G01D 5/3473* (2013.01); *G01D 5/34792* (2013.01)

(58) Field of Classification Search
CPC .......................... G01D 5/2455; G01D 5/34784
See application file for complete search history.

(56) References Cited

U.S. PATENT DOCUMENTS

| | | | |
|---|---|---|---|
| 6,742,275 B2 | 6/2004 | Mayer et al. | |
| 8,785,838 B2 | 7/2014 | Ishizuka | |
| 2012/0032068 A1 | 2/2012 | Ishizuka | |
| 2012/0153135 A1* | 6/2012 | Ishizuka | G01D 5/244 250/231.18 |

FOREIGN PATENT DOCUMENTS

| | | |
|---|---|---|
| DE | 102012212767 A1 | 1/2014 |
| EP | 1329696 A1 | 7/2003 |
| JP | 2012037392 A | 2/2012 |
| JP | 2012127818 A | 7/2012 |

OTHER PUBLICATIONS

Extended European Search Report issued in EP15001887.7, dated Nov. 10, 2015.

* cited by examiner

*Primary Examiner* — Tony Ko
(74) *Attorney, Agent, or Firm* — Rossi, Kimms & McDowell LLP

(57) ABSTRACT

An absolute encoder includes: a scale on which plural marks are arrayed; plural detecting devices each configured to detect a mark group of the plural marks and output a signal corresponding to the mark group; and a processor configured to obtain a coordinate of the scale based on outputs of the detecting devices. The plural marks are arrayed such that a signal obtained by adding plural signals respectively output from the detecting devices includes a periodic signal corresponding to plural periods. The processor obtains first position data based on a magnitude of at least one signal of the plural signals, obtains second position data having a resolution higher than that of the first position data based on a phase of the periodic signal, and generates data representing the coordinate based on the first and second position data.

15 Claims, 12 Drawing Sheets

| No.1 | No.2 | No.3 | No.4 | No.5 | No.6 | No.7 | No.8 | No.9 | No.10 | No.11 | No.12 | No.13 | No.14 | No.15 | No.16 |
|------|------|------|------|------|------|------|------|------|-------|-------|-------|-------|-------|-------|-------|
| 1 | 1 | 1 | 0 | 1 | 1 | 1 | 1 | 1 | 1 | 1 | 0 | 1 | 1 | 1 | 1 |
| No.501 | No.502 | No.503 | No.504 | No.505 | No.506 | No.507 | No.508 | No.509 | No.510 | No.511 | No.512 | No.513 | No.514 | No.515 | No.516 |
| 0 | 0 | 0 | 1 | 0 | 0 | 0 | 0 | 0 | 0 | 0 | 1 | 0 | 0 | 0 | 0 |

| No.1 | No.2 | No.3 | No.4 | No.5 | No.6 | No.7 | No.8 | No.9 | No.10 | No.11 | No.12 | No.13 | No.14 | No.15 | No.16 |
|---|---|---|---|---|---|---|---|---|---|---|---|---|---|---|---|
| 0 | 0 | 0 | 2 | 2 | 0 | 2 | 1 | 0 | 0 | 0 | 0 | 1 | 0 | 1 | 0 |
| No.501 | No.502 | No.503 | No.504 | No.505 | No.506 | No.507 | No.508 | No.509 | No.510 | No.511 | No.512 | No.513 | No.514 | No.515 | No.516 |
| 2 | 2 | 2 | 0 | 0 | 2 | 2 | 1 | 2 | 2 | 2 | 2 | 1 | 2 | 1 | 2 |

| No.1 | No.2 | No.3 | No.4 | No.5 | No.6 | No.7 | No.8 | No.9 | No.10 | No.11 | No.12 | No.13 | No.14 | No.15 | No.16 |
|---|---|---|---|---|---|---|---|---|---|---|---|---|---|---|---|
| 0 | 0 | 0 | 2 | 2 | 0 | 0 | 1 | 0 | 0 | 0 | 0 | 1 | 0 | 1 | 0 |
| No.334 | No.335 | No.336 | No.337 | No.338 | No.339 | No.340 | No.341 | No.342 | No.343 | No.344 | No.345 | No.346 | No.347 | No.348 | No.349 |
| 1 | 1 | 1 | 0 | 0 | 1 | 1 | 2 | 1 | 1 | 1 | 1 | 2 | 1 | 2 | 1 |
| No.667 | No.668 | No.669 | No.670 | No.671 | No.672 | No.673 | No.674 | No.675 | No.676 | No.677 | No.678 | No.679 | No.680 | No.681 | No.682 |
| 2 | 2 | 2 | 1 | 1 | 2 | 2 | 0 | 2 | 2 | 2 | 2 | 0 | 2 | 0 | 2 |

ABSOLUTE ENCODER

BACKGROUND OF THE INVENTION

Field of the Invention

The present invention relates to an absolute encoder.

Description of the Related Art

An absolute encoder is used for the purpose of measuring the absolute value (absolute coordinate) of a position or an angle. The absolute encoder can output absolute position information by reading a binary pattern of gray codes, M-sequence codes, or the like using a photoelectric conversion element array or an image sensor (imaging element or imaging device). Some absolute encoders use a plurality of grating arrays (mark arrays), and some use a single grating array. As a method using a plurality of grating arrays, a gray code method is known. In the gray code method, pieces of information of a plurality of tracks to locate different codes are simultaneously read. Since the plurality of tracks are simultaneously read, the gray code method has a problem that the mount sensitivity of an encoder head and a scale is high, and it is difficult to implement a high resolution.

As a method of a low mount sensitivity, a method using a single grating array is known. Japanese Patent Laid-Open No. 2012-37392 discloses an absolute encoder that raises the resolution using a single grating array. The absolute encoder disclosed in Japanese Patent Laid-Open No. 2012-37392 embeds codes corresponding to absolute codes in the single grating array with grayscales, and uses a signal having a grayscale as the peak value of each grating (mark). The absolute encoder disclosed in Japanese Patent Laid-Open No. 2012-37392 integrates absolute position information obtained based on the grayscales and the phase information of a periodic signal obtained from the signal, and outputs high-resolution absolute position information.

In an incremental encoder, conventionally, two detecting devices are located for one scale so as to face each other and average the angle measurement values, thereby reducing errors caused by the eccentricity of a disc. Japanese Patent Laid-Open No. 2012-127818 discloses an absolute rotary encoder having a high resolution and high accuracy implemented by applying the method to an absolute encoder.

In Japanese Patent Laid-Open No. 2012-127818, a normalization process is performed to obtain the periodic signal. This normalization process needs a division process with a heavy operation load to (a processor of) the encoder.

SUMMARY OF THE INVENTION

The present invention provides, for example, an absolute encoder advantageous in terms of operation load thereto.

The present invention provides an absolute encoder comprising: a scale on which a plurality of marks including a plurality of types of marks are arrayed at a pitch with a gap therebetween; a plurality of detecting devices each configured to detect a mark group of the plurality of marks and output a signal corresponding to the mark group; and a processor configured to obtain a coordinate of the scale based on outputs of the plurality of detecting devices, wherein the plurality of marks are arrayed on the scale such that a signal obtained by adding a plurality of signals respectively output from the plurality of detecting devices includes a periodic signal corresponding to a plurality of periods, and the processor is configured to obtain first position data based on a magnitude of at least one signal, with respect to a portion corresponding to a mark of the mark group, of the plurality of signals, obtain second position data having a resolution higher than that of the first position data based on a phase of the periodic signal, and generate data representing the coordinate based on the first position data and the second position data.

Further features of the present invention will become apparent from the following description of exemplary embodiments with reference to the attached drawings.

DESCRIPTION OF THE EMBODIMENTS

The embodiments of the present invention will now be described in detail with reference to the accompanying drawings.

First Embodiment

Figure 1A:
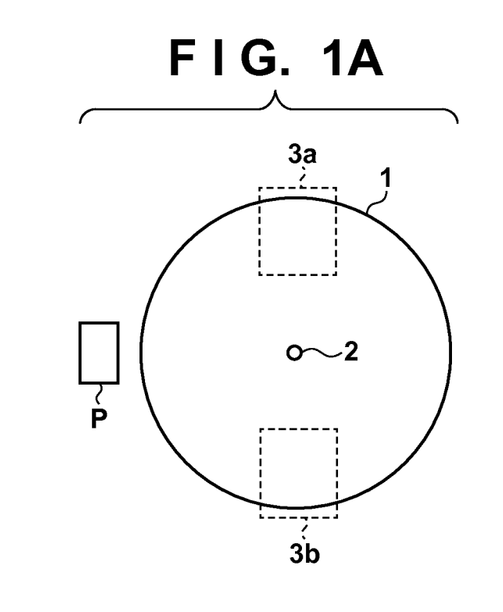
FIGS. 1A and 1B are schematic views showing the arrangement of an absolute rotary encoder according to the present invention.
Figure 1B:
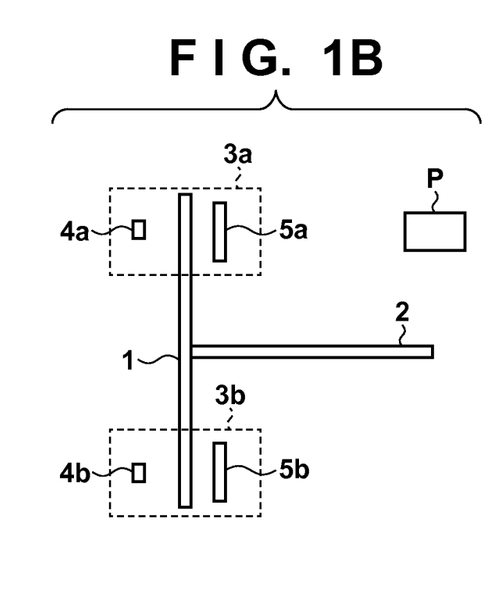

FIGS. 1A and 1B are views for explaining the arrangement of an absolute encoder according to the first embodiment. The absolute encoder according to the embodiment is formed as an absolute rotary encoder that includes a scale in which a plurality of marks are arrayed at a gap and a pitch on a disc (rotating member) that rotates about an axis serving as a rotation center, and calculates the absolute rotation angle of the scale. In the first embodiment, detecting devices (heads) 3 are located to have point symmetry (two-fold rotational symmetry) and face each other at 180°, and a binary code will be exemplified as an absolute code. As shown in FIG. 1A, the absolute rotary encoder according to the first embodiment includes a disc-shaped scale 1, two heads 3a and 3b, and a processor P that obtains the coordinate of the scale 1. The scale 1 is configured to be rotatable about an axis 2 serving as a rotation center. A plurality of marks including at least two types of marks are radially arrayed at a predetermined period about the axis 2 along the circumferential direction. FIG. 1B is a sectional view of FIG. 1A. Each of the heads 3 includes a light source 4, and a photoelectric conversion element array (detector) 5 including a plurality of photoelectric conversion elements. The two heads 3a and 3b are placed at point-symmetrical positions shifted by 180° from each other.

Figure 2:
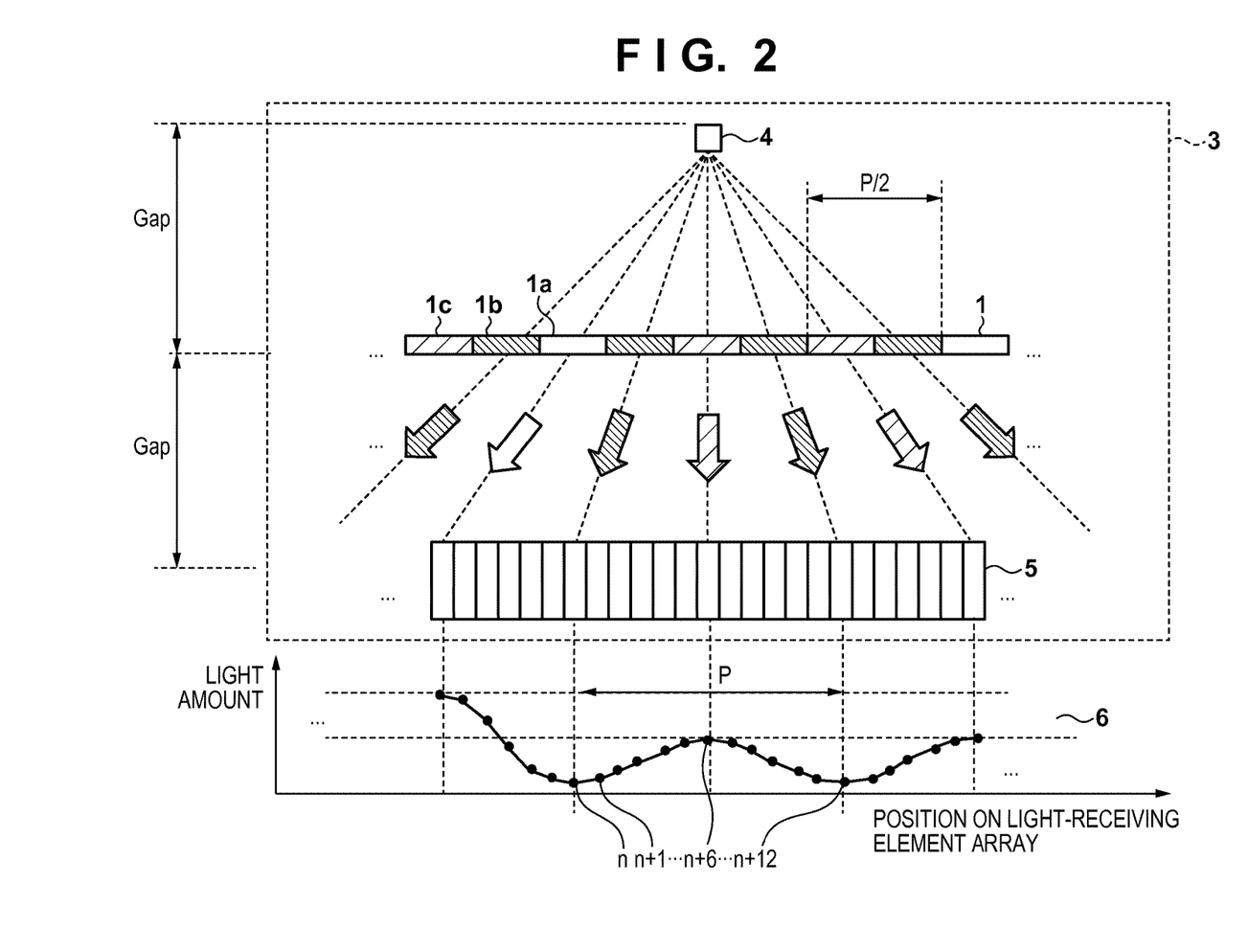
FIG. 2 is a schematic view showing the arrangement of the scale and detector of the absolute rotary encoder according to the present invention.

FIG. 2 is a view showing the relationship between the scale 1, the light source 4, and the photoelectric conversion element array 5. As shown in FIG. 2, diverging light emitted by the point light source 4 which may be an LED enters the scale 1 that is placed to be relatively movable, and the light transmitted through the scale 1 is detected by the photoelectric conversion element array 5. The scale 1 has a structure in which non-transmissive marks 1b are located as reference marks, and transmissive marks 1a and semi-transmissive marks 1c serving as code marks and having the same shape and transmittances different from each other are arrayed between the non-transmissive marks 1b, thereby embedding absolute codes. The transmittances of the transmissive marks 1a, the non-transmissive marks 1b, and the semi-transmissive marks 1c, which are different from each other, can be set to, for example, 60%, 5%, and 30%, respectively. The transmissive marks 1a and the non-transmissive marks 1b can be implemented by depositing a metal or the like onto glass that makes the scale 1 and processing it into a slit shape. The semi-transmissive marks 1c can be implemented either by selectively depositing a dielectric film or the like onto the slit portions or by selectively changing the area of the slit.

As the absolute codes used here, M-sequence codes formed by setting the transmissive marks 1a to 1 and the semi-transmissive marks 1c to 0 or other cyclic codes generated by a primitive polynomial are usable. A light beam transmitted through the scale 1 has a sinusoidal periodicity like a periodicity obtained by an incremental encoder, and the amplitude that reflects the information of the absolute codes is modulated to form a light amount distribution having a change in the grayscale. FIG. 2 shows a light amount distribution 6 of light transmitted through a mark group at part of the scale 1 detected by the photoelectric conversion element array 5.

The photoelectric conversion element array 5 is formed from a CMOS or CCD sensor. The photoelectric conversion element array 5 is configured such that the phases of signals output from the photoelectric conversion elements are shifted at equal intervals by deciding the design value of the pitch of the photoelectric conversion elements so as to divide a design value P of one light/shade period of the light amount distribution decided by the arrangement of the optical system into N parts. For example, the number of bits of the absolute codes is set to M=16, and the number of divisions of the photoelectric conversion element array corresponding to one light/shade period of the light amount distribution is set to N=12. When the number of elements of the photoelectric conversion element array 5 is set to N×M=192, periodic signals corresponding to a plurality of periods having the information of the absolute codes can be obtained. An example in which M=16, and N=12 will be described below. In actuality, the number of photoelectric conversion elements of the photoelectric conversion element array 5 can be decided with a margin to provide redundancy. The number of read bits may be larger than the number of bits of the absolute codes.

Figure 3:
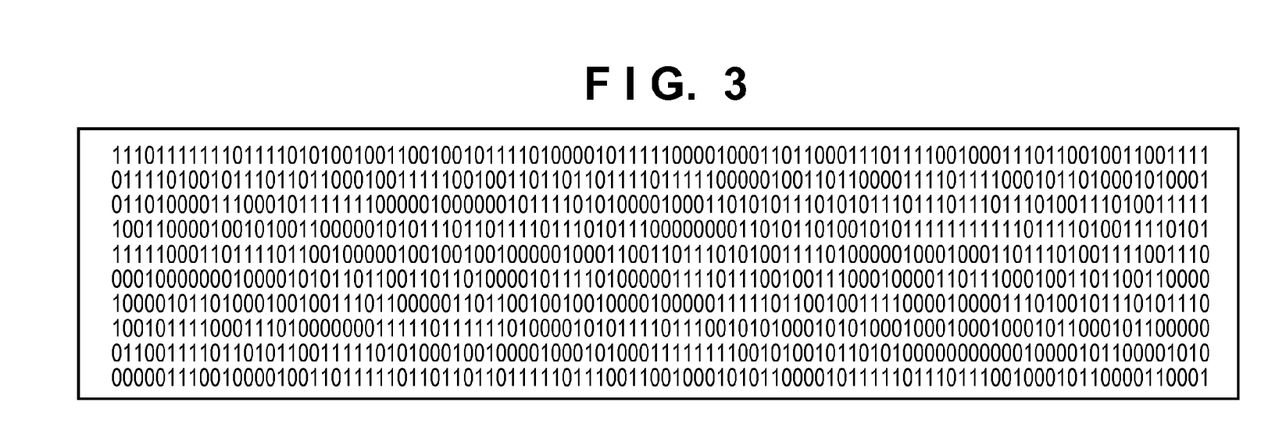
FIG. 3 is a view showing an example of a code sequence representing the absolute codes of the absolute rotary encoder according to the present invention.

FIG. 3 shows an example of a code sequence including 1,000 codes. An absolute rotary encoder of 1,000 pulses can be formed using this code sequence. The design value P of one light/shade period of the light amount distribution is set to, for example, 160 um. Then, in an optical system that projects an optical image twice as large as the scale 1 onto the photoelectric conversion element array 5 using diverging light as shown in FIG. 2, one light/shade period on the scale 1 is P/2=80 um, and the diameter of the scale 1 is about φ25.4 mm.

Figure 4:
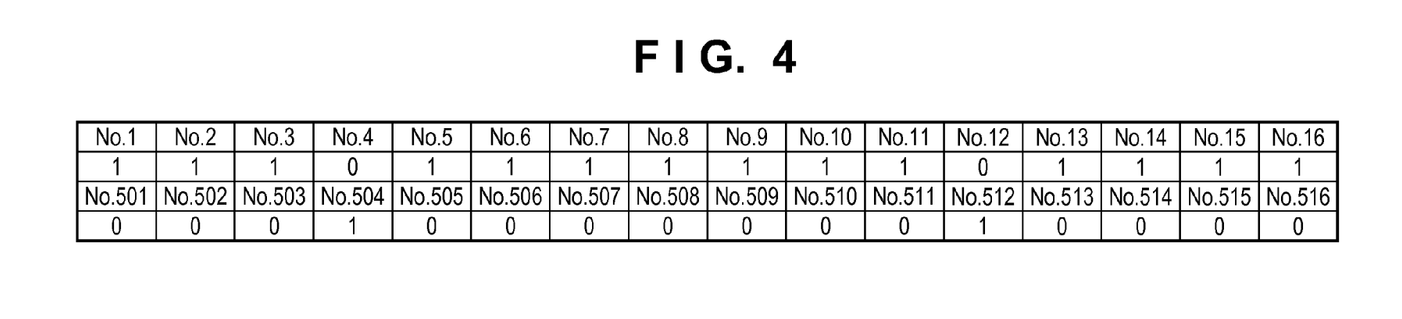
FIG. 4 is a view showing an example in which codes at the positions of 180° rotational symmetry on the scale are inverted in the code sequence representing the absolute codes of the absolute rotary encoder according to the present invention.

The code sequence shown in FIG. 3 is created by inverting the codes at the positions of 180° rotational symmetry with respect to the rotation center 2 of the scale 1 from each other. In the example of 1,000 pulses shown in FIG. 3, the code sequence of the first to 500th codes and that of the 501st to 1,000th codes are inverted code sequences having characteristics complementary to each other and different from each other. That is, in the first and 501st codes, second and 502nd codes, . . . , 499th and 999th codes, and 500th and 1,000th codes, if one of the codes is 1, the other is 0, and if one of the codes is 0, the other is 1. In other words, the sum of one code and the other code is always 1. The codes of the code sequence shown in FIG. 3 are numbered No. 1, No. 2, No. 3, . . . from the first code. FIG. 4 shows an example in which the codes of marks No. 501 to No. 516 are inverted with respect to the codes of marks No. 1 to No. 16. FIG. 4 shows the codes of ith (i=1, 2, . . . , n) marks out of n (16 in this case) consecutive codes simultaneously detected by the two photoelectric conversion element arrays 5. In addition, the code sequence shown in FIG. 3 forms 16-bit pseudo-random number sequences as well. That is, in this code sequence, all code sequences of 16-bit consecutive codes do not have the same code sequence.

Figure 5A:
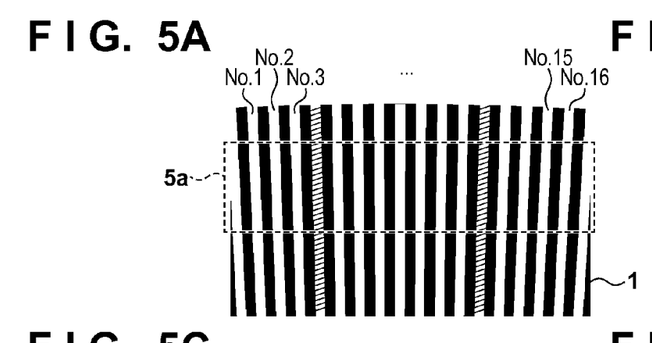
FIGS. 5A to 5F are schematic views showing the arrangement of the detector of an absolute rotary encoder according to the first embodiment and output signals.
Figure 5B:
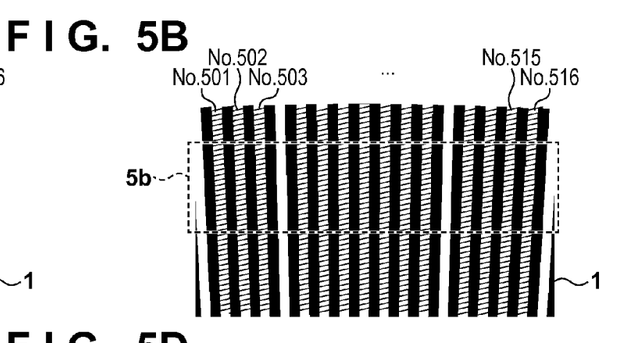

FIGS. 5A and 5B are views showing the relationship between the scale 1 and the photoelectric conversion element array 5 of the absolute rotary encoder according to the first embodiment. FIG. 5A is a view showing a state in which codes No. 1 to No. 16 of the code sequence shown in FIG. 3 are read by a photoelectric conversion element array 5a. FIG. 5B is a view showing a state in which codes No. 501 to No. 516 of the code sequence shown in FIG. 3 are read by a photoelectric conversion element array 5b. The white, black, and hatched portions in FIGS. 5A and 5B represent the transmissive marks 1a, the non-transmissive marks 1b, and the semi-transmissive marks 1c, respectively. The photoelectric conversion element array 5a is divided into light-receiving elements which are referred to as Ch1, Ch2, . . . , Ch192 sequentially from the left side. Similarly, the photoelectric conversion element array 5b is divided into light-receiving elements which are referred to as Ch1, Ch2, . . . , Ch192.

Figure 5C:
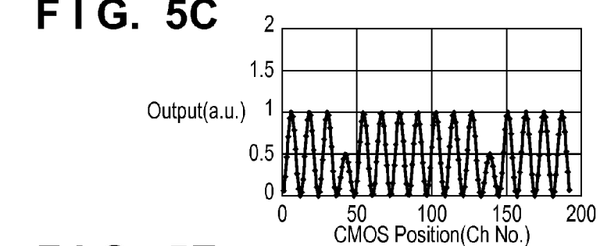
Figure 5D:
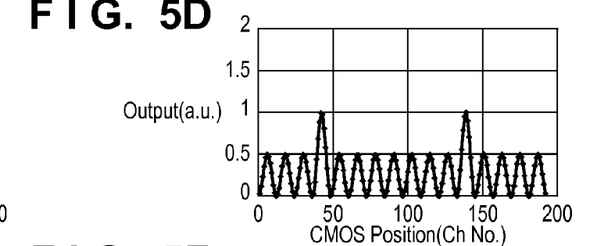
Figure 5E:
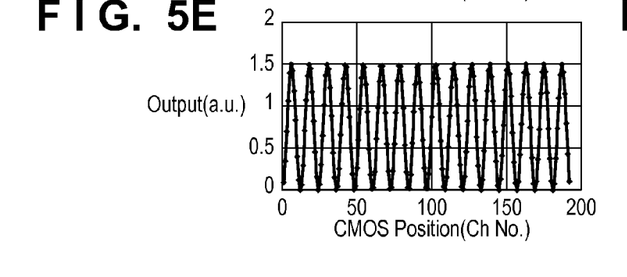
Figure 5F:
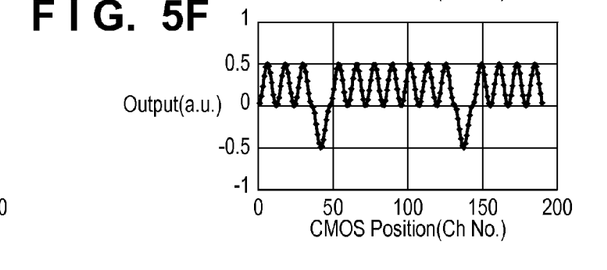

FIG. 5C shows an output signal reflecting the light amount distribution 6 output from the photoelectric conversion element array 5a. FIG. 5D shows an output signal reflecting the light amount distribution 6 output from the photoelectric conversion element array 5b. Ch numbers of the photoelectric conversion element array are plotted along the abscissa, and the values of the output signal reflecting the light amount distribution are plotted along the ordinate. As described above, the code sequence shown in FIG. 3 includes cyclic codes in which the codes at the positions of 180° rotational symmetry on the scale 1 are inverted. Hence, in FIGS. 5C and 5D, periodic signals in which the change in the grayscale reflecting the information of the absolute codes is inverted are output. Waveform data shown in FIG. 5C will be referred to as waveform data a, and waveform data shown in FIG. 5D will be referred to as waveform data b. FIG. 5E shows waveform data obtained by adding the waveform data a and the waveform data b for each Ch. FIG. 5F shows waveform data obtained by subtracting the waveform data b from the waveform data a for each Ch. The waveform data a and the waveform data b are periodic signals in which the change in the grayscale is inverted. For this reason, when they are added, a periodic signal having a predetermined amplitude is obtained, as shown in FIG. 5E. This indicates that a normalization process can be performed by an addition process of light load without any division process of heavy load, unlike the encoder described in Japanese Patent Laid-Open No. 2012-127818. Additionally, as shown in FIG. 5F, in the signal obtained by calculating the difference between the waveform data a and the waveform data b, the difference between the grayscales representing codes 1 and 0 is twice as large as the output signals shown in FIGS. 5C and 5D. This indicates that the robustness of the code determination signal is improved by the simple difference operation. The processor P performs the addition and subtraction processes of the signals shown in FIGS. 5C and 5D, which are output from the two photoelectric conversion element arrays 5a and 5b, thereby acquiring the signals shown in FIGS. 5E and 5F. The processor P also performs phase calculation for the signal shown in FIG. 5E and code determination for the signal shown in FIG. 5F, thereby outputting absolute position information.

Figure 6:
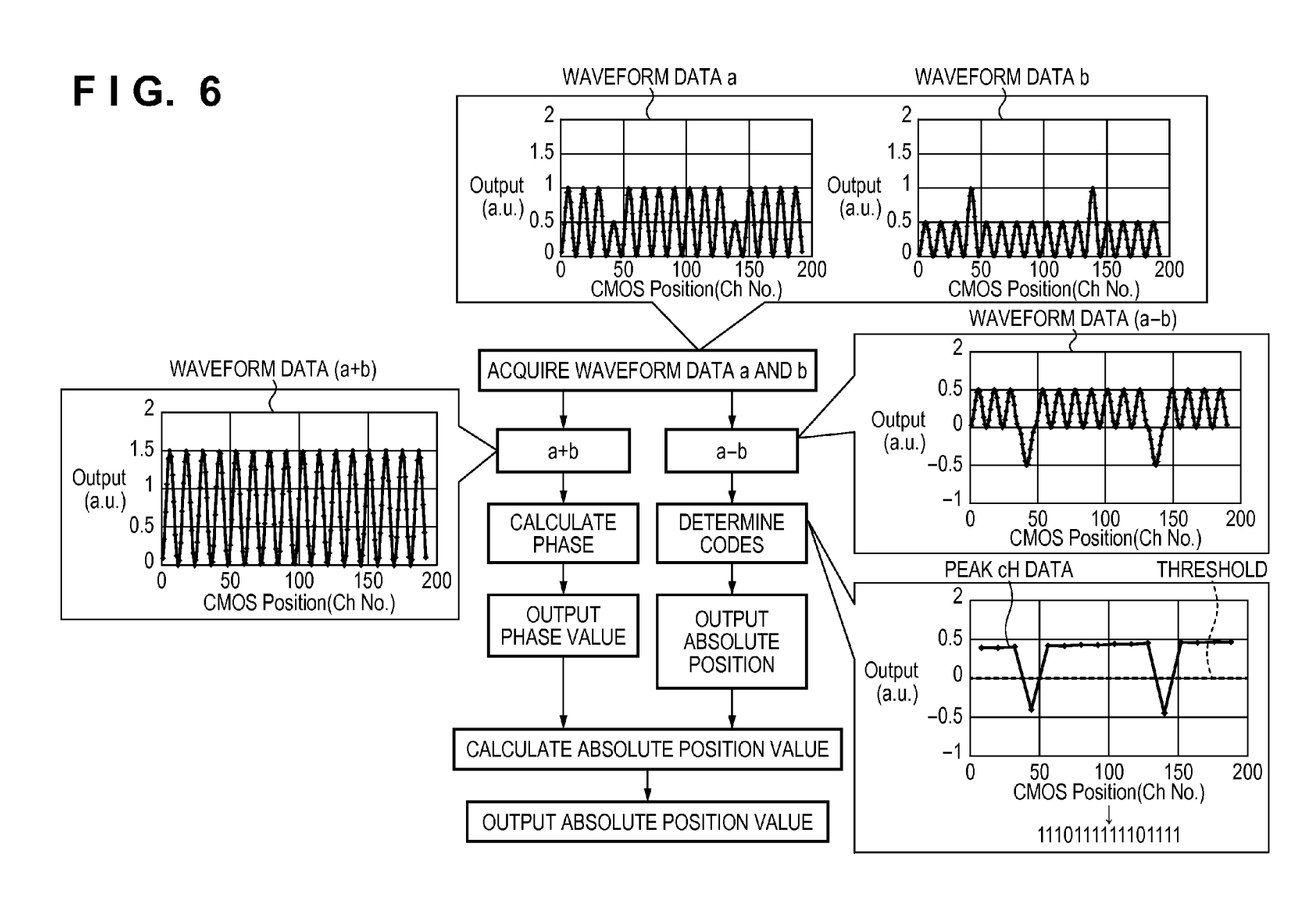
FIG. 6 is a flowchart showing signal processing of the absolute rotary encoder according to the present invention.

FIG. 6 shows the procedure of signal processing performed by the processor P of the absolute rotary encoder according to the first embodiment. The processor P first acquires the waveform data a and b from the opposing photoelectric conversion element arrays 5a and 5b, respectively. The processor P performs addition and subtraction of the two acquired waveform data a and b, thereby generating a periodic signal (a+b) having a predetermined amplitude and a code determination signal (a−b) having a large grayscale difference. The processor P performs the phase calculation, for example, in the following way. Using the output value (a+b) of the periodic signal having the predetermined amplitude obtained by addition, the processor P multiplies, for example, each of four reference signals by the output value and performs an inverse tangent operation of the total sum of the signals, thereby deciding a phase at the same accuracy as an incremental encoder. As the four reference signals, for example, four signals having a phase difference of $\pi/4$ and a predetermined amplitude at the same period as the design value of the light/shade period of the output signal can be used. The method of calculating the phase from the signal obtained by addition has been described above. However, a phase may be calculated from each of the waveform data a and b, and the obtained phases may be averaged to calculate the phase.

The processor P performs code determination, for example, in the following way. First, the processor P compares the magnitudes of output values between each CH and adjacent CHs for one of the waveform data a, waveform data b, and the data (a−b) obtained by subtraction, and decides the CH (peak CH) as the local maximum of the periodic signal. In the first embodiment, a periodic signal corresponding to 16 periods is acquired. Hence, 16 peak CHs are decided. In the first embodiment, the data of the peak CHs to be used for data code determination are extracted from the data (a−b). Finally, the processor P performs threshold determination for the code determination data (the data of the peak CHs) and quantizes the amplitude of the periodic signal, thereby calculating the absolute codes. FIG. 6 shows a graph of code determination data extracted from the data (a−b). In this embodiment, the threshold is set as indicated by the dotted line, thereby determining each code depending on whether the code determination data is positive or negative. If the code determination data is positive, the code is determined as 1. If the code determination data is negative, the code is determined as 0. Then, 1110111111101111 is obtained as the absolute codes. As can be seen from comparison with FIGS. 5A and 5B, the absolute codes obtained by the code determination data (the data of the peak CHs) match the absolute codes of the photoelectric conversion element array 5a. When calculating the absolute codes in accordance with this procedure, the photoelectric conversion element array 5a serves as the reference position as the encoder. To employ the photoelectric conversion element array 5b as the reference position, the threshold determination method is changed, or the order of subtraction is changed. The method of determining the codes from the signal obtained by subtraction has been described above. However, the code determination may be done by setting a threshold for the waveform data a or the waveform data b.

The processor P acquires the data (first position data) of the integer part of the absolute position from the absolute codes using a lookup table (not shown) created in advance. The processor P composites the data of the integer part of the absolute position and the data (second position data) of the decimal part calculated from the phase and having a minimum unit (resolution) smaller than the first position data so as to calculate the absolute position. As described above, in the first embodiment, cyclic codes in which the codes at the positions of 180° rotational symmetry are inverted are added to the scale 1, and the photoelectric conversion element arrays 5a and 5b are provided at the opposing positions on the scale 1. In the first embodiment, this can implement an accurate absolute rotary encoder having an arrangement of light calculation load.

Second Embodiment

Figure 7A:
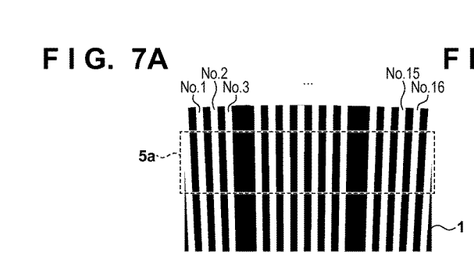
FIGS. 7A to 7F are schematic views showing the arrangement of the detector of an absolute rotary encoder according to the second embodiment and output signals.
Figure 7B:
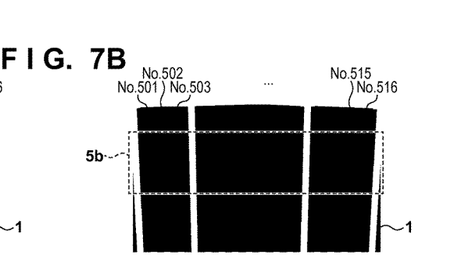
Figure 7C:
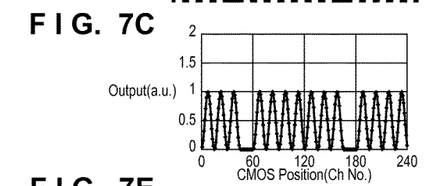
Figure 7D:
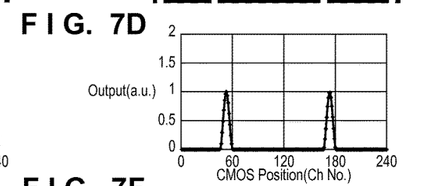
Figure 7E:
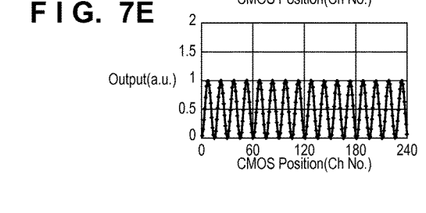
Figure 7F:
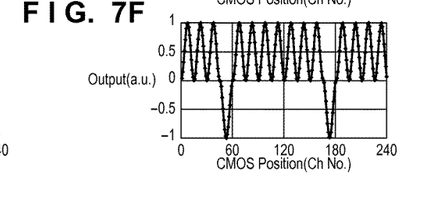

In the first embodiment, an example has been described in which the transmittances of the transmissive marks 1a, the non-transmissive marks 1b, and the semi-transmissive marks 1c are set to 60%, 5%, and 30%, respectively. However, an arrangement that sets the same transmittance value for the non-transmissive marks 1b and the semi-transmissive marks 1c is also possible. FIGS. 7A to 7F show an example of the arrangement that sets the same transmittance value for non-transmissive marks 1b and semi-transmissive marks 1c. The code sequence that is used is the code sequence shown in FIG. 3, as in the first embodiment. A case where codes No. 1 to No. 16 and codes No. 501 to No. 516 of the code sequence are read is illustrated. FIGS. 7C and 7D show output signals reflecting a light amount distribution 6 output from photoelectric conversion element arrays 5a and 5b. Waveform data shown in FIGS. 7C and 7D will be referred to as waveform data a and waveform data b, respectively. FIG. 7E shows data (a+b) corresponding to the sum of the waveform data a and the waveform data b for each Ch. FIG. 7F shows data (a−b) corresponding to the difference between the waveform data a and the waveform data b for each Ch. As is apparent from FIG. 7C, since the transmittance values of the non-transmissive marks 1b and the semi-transmissive marks 1c equal, loss occurs in the periodic signal. However, when an addition process is performed, a periodic signal without loss can be obtained. In addition, code determination data can be obtained from the data (a−b) shown in FIG. 7F, as in the first embodiment. Signal processing of the obtained signals can be performed as in the first embodiment. As described above, in the arrangement that sets the same transmittance value for the non-transmissive marks 1b and the semi-transmissive marks 1c as well, it is possible to implement an accurate absolute rotary encoder having an arrangement of light calculation load.

Third Embodiment

In the first and second embodiments, an example in which a binary code represented by 0 or 1 is employed as an absolute code has been described. However, a multilevel code may be employed. In the third embodiment, a case where a ternary code represented by 0, 1, or 2 is employed will be described. Components other than a scale 1 are the same as in the first and second embodiments, and a description thereof will be omitted. Although not illustrated, the scale 1 has a structure in which non-transmissive marks 1b are located as reference marks, and transmissive marks 1a, first semi-transmissive marks 1c, and second semi-transmissive marks 1d serving as code marks are arrayed between the non-transmissive marks 1b, thereby embedding absolute codes. The transmittances of the transmissive marks 1a, the non-transmissive marks 1b, the first semi-transmissive marks 1c, and the second semi-transmissive marks 1d can be set to, for example, 60%, 5%, 40%, and 20%, respectively.

The ternary absolute code is formed from the transmissive mark 1a representing 2, the first semi-transmissive mark 1c representing 1, or the second semi-transmissive mark 1d representing 0. Although not illustrated, as in the first embodiment, a light beam transmitted through the scale 1 has a sinusoidal periodicity like a periodicity obtained by an incremental encoder, and forms a transmitted light amount distribution reflecting the information of the absolute codes and having a change in the grayscale.

Figure 8:
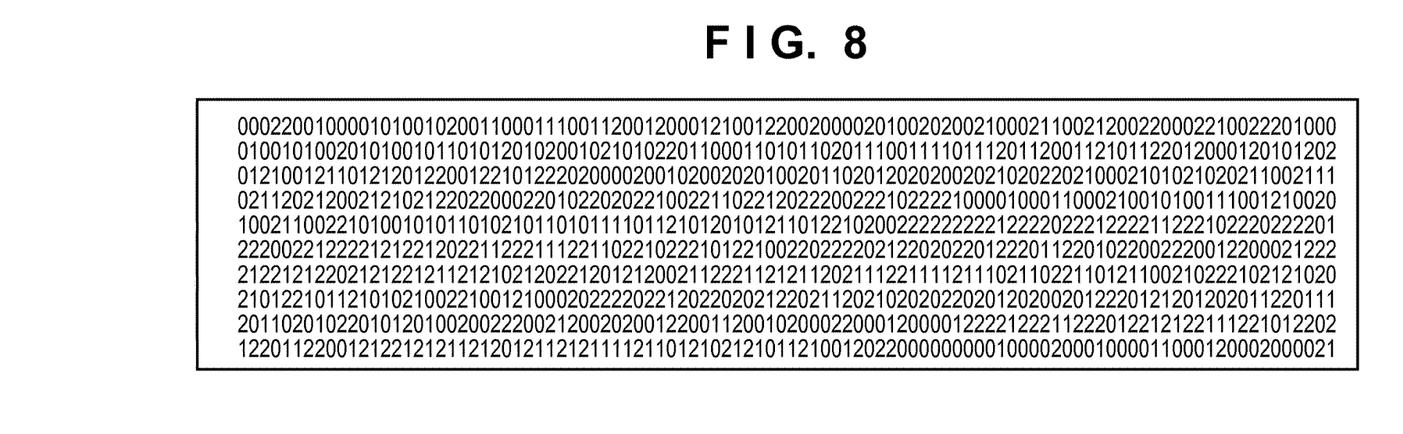
FIG. 8 is a view showing an example of a code sequence representing the absolute codes of an absolute rotary encoder according to the third embodiment.
Figure 9:
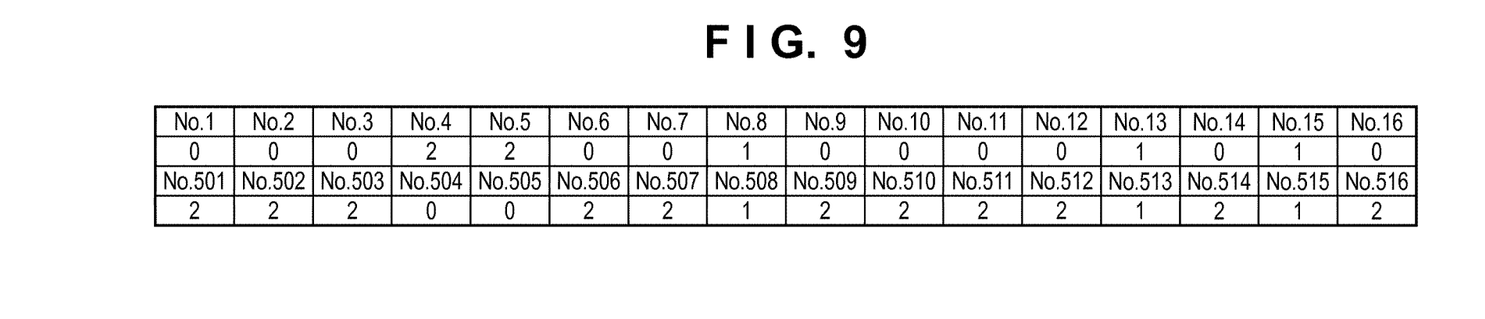
FIG. 9 is a view showing an example in which codes are located so as to obtain a constant sum of codes at the positions of 180° rotational symmetry on the scale in the code sequence representing the absolute codes according to the third embodiment.

A code sequence shown in FIG. 8 includes three values 0, 1, and 2. The codes are arrayed such that a periodic signal having a predetermined amplitude is obtained by adding two periodic signals obtained from opposing photoelectric conversion element arrays 5a and 5b and having a change in the grayscale. In the third embodiment, the code sequence is created such that the sum of two codes at the positions of 180° rotational symmetry with respect to the rotation center of the scale 1 is always 2 based on the above-described correspondence relationship between codes and transmittances. In the example of 1,000 pulses, the sum of corresponding codes of the code sequence of the first to 500th codes and that of the 101st to 1,000th codes is 2. That is, in the first and 501st codes, second and 502nd codes, . . . , 499th and 999th codes, and 500th and 1,000th codes, if one of the codes is 2, the other is 0, if one of the codes is 1, the other is 1, and if one of the codes is 0, the other is 2. The codes of the code sequence shown in FIG. 8 are numbered No. 1, No. 2, No. 3, . . . from the first code. FIG. 9 shows an example of codes No. 1 to No. 16 and codes No. 501 to No. 516. The code sequences shown in FIG. 9 are 16-bit pseudo-random number sequences.

Figure 10A:
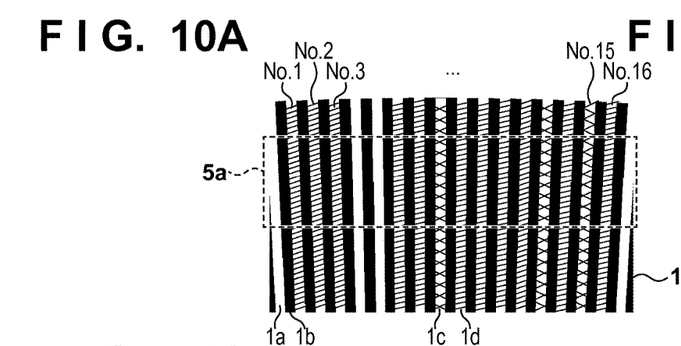
FIGS. 10A to 10F are schematic views showing the arrangement of the detector of the absolute rotary encoder according to the third embodiment and output signals.
Figure 10B:
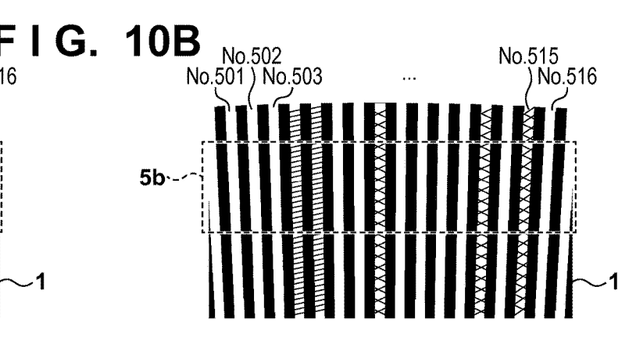

FIGS. 10A and 10B are views showing the relationship between the scale 1 and the photoelectric conversion element array 5 of the absolute rotary encoder according to the third embodiment. FIG. 10A is a view showing a state in which codes No. 1 to No. 16 of the code sequence shown in FIG. 9 are read by the photoelectric conversion element array 5a. FIG. 10B is a view showing a state in which codes No. 501 to No. 516 of the code sequence shown in FIG. 9 are read by the photoelectric conversion element array 5b. The white, black, crosshatched, and hatched portions in FIGS. 10A and 10B represent the transmissive marks 1a, the non-transmissive marks 1b, the first semi-transmissive marks 1c, and the second semi-transmissive marks 1d, respectively. Each of the photoelectric conversion element arrays 5a and 5b is divided into photoelectric conversion elements (not shown) which are referred to as Ch1, Ch2, . . . , Ch192 sequentially from the left side.

Figure 10C:
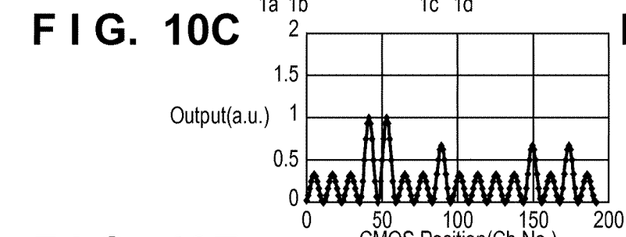
Figure 10D:
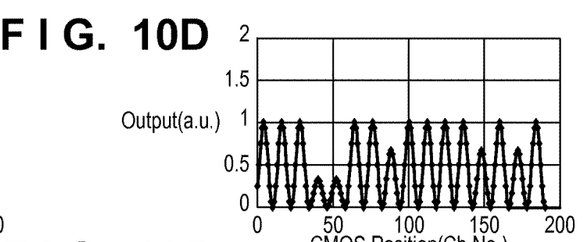
Figure 10E:
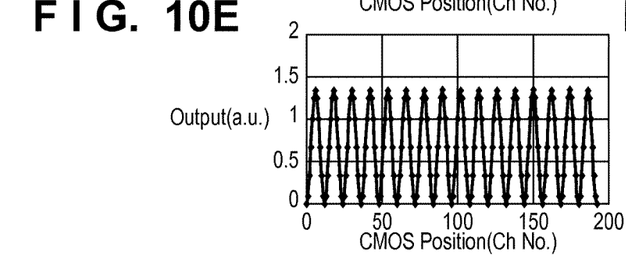
Figure 10F:
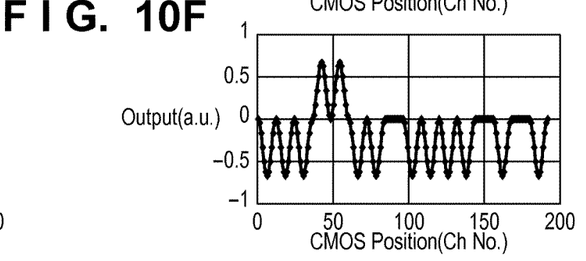

FIGS. 10C and 10D are views showing the waveform data a and the waveform data b that are output signals reflecting the light amount distribution 6 output from the photoelectric conversion element arrays 5a and 5b, respectively. Ch numbers of the photoelectric conversion element array are plotted along the abscissa, and the values of the output signal reflecting the light amount distribution are plotted along the ordinate. As described above, the code sequence shown in FIG. 9 includes cyclic codes in which the codes at the positions of 180° rotational symmetry on the scale 1 are inverted. Hence, in FIGS. 10C and 10D, periodic signals in which the change in the grayscale reflecting the information of the absolute codes are inverted are output. These waveform data will be referred to as waveform data a and waveform data b, respectively. FIG. 10E shows data (a+b) obtained by adding the waveform data a and b for each Ch. This data is a periodic signal in which the amplitude of the waveform data a or b is unified. FIG. 10F shows data (a−b) obtained by subtracting the waveform data b from the waveform data a for each Ch. The difference between the grayscales representing codes 2, 1, and 0 is twice as large as the output signals shown in FIGS. 10C and 10D. This indicates that the robustness of the code determination signal is improved by the simple subtraction. Signal processing of the signal obtained as shown in FIG. 10E can be performed as in the first embodiment.

Figure 11:
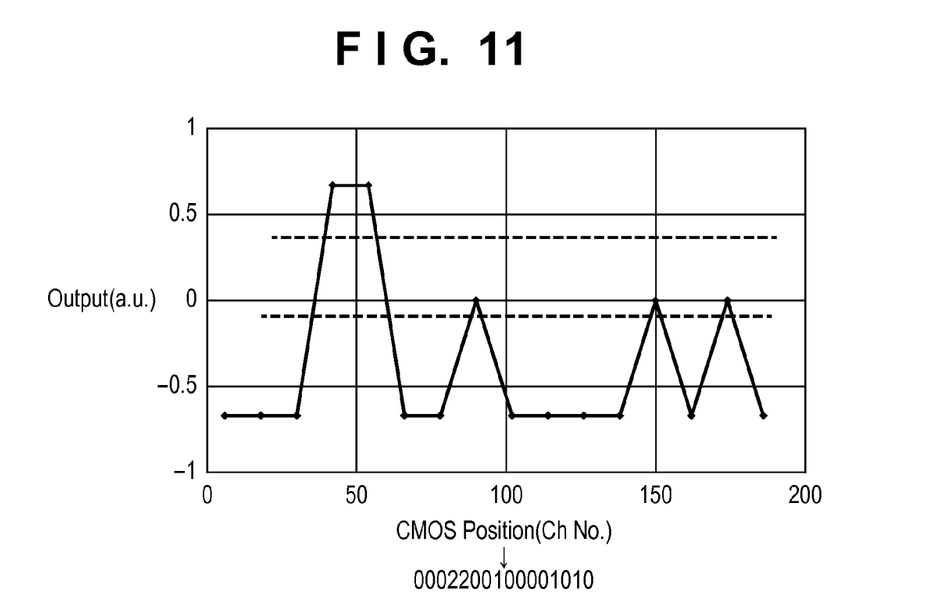
FIG. 11 is a graph showing an example of absolute code determination according to the third embodiment.

As for code determination, since a code is represented by a ternary grayscale, the number of thresholds needs to be increased. FIG. 11 is a graph that enlarges the code determination data obtained as shown in FIG. 10F. In a case where the waveform data b shown in FIG. 10D is subtracted from the waveform data a shown in FIG. 10C, the code determination data is negative when the code corresponding to the detector 5a is 0, the code determination data is 0 when the code is 1, and the code determination data is positive when the code is 2 because of the relationship between codes and transmittances. Hence, when two thresholds indicated by the dotted lines in FIG. 11 are set, the codes 0, 1, and 2 can be determined. The code determination result shown in FIG. 11 is 0002200100001010.

As described above, even with the scale 1 including ternary absolute codes, an accurate absolute rotary encoder having an arrangement of light calculation load can be implemented. An example of ternary codes has been described. However, absolute codes having an arbitrary number of grayscales can be formed on the disc by deciding the location of codes and the correspondence relationship between codes and transmittances such that a periodic signal having a predetermined amplitude is obtained by adding two periodic signals of different grayscales. In addition, it is self-evident that the absolute codes can be demodulated by appropriately deciding the thresholds from the location of codes and the correspondence relationship between codes and transmittances.

Fourth Embodiment

Figure 12:
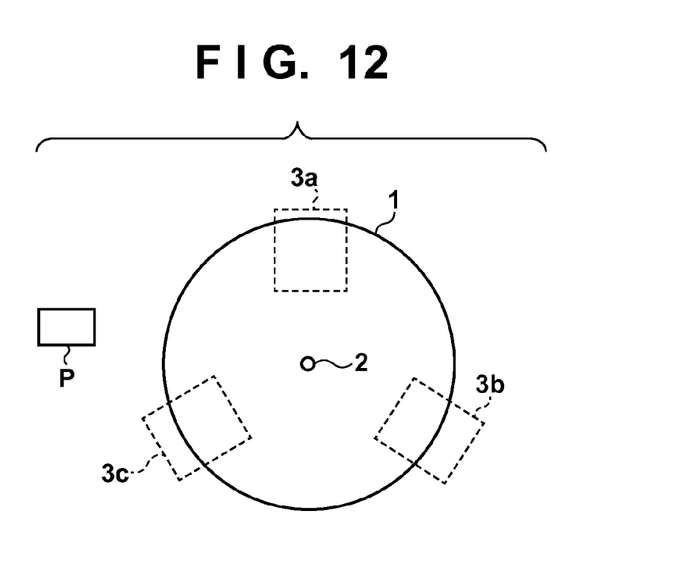
FIG. 12 is a schematic view showing the arrangement of an absolute rotary encoder according to the fourth embodiment.

In the first to third embodiments, an example has been described in which the sets 3a and 3b each including the light source 4 and the photoelectric conversion element array 5 are located so as to have two-fold rotational symmetry, that is, shifted by 180° with respect to the rotation axis 2 of the scale 1. However, a location that further increases the number of sets of the light source 4 and the photoelectric conversion element array 5 is also possible. In the fourth embodiment, a case where sets 3a to 3c each including a light source 4 and a photoelectric conversion element array 5 are located so as to have three-fold rotational symmetry with respect to a rotation axis 2 of a scale 1 will be described. As shown in FIG. 12, an absolute rotary encoder includes the scale 1, the three detecting devices 3 each including the light source 4 and the photoelectric conversion element array 5, and a signal processor P. The scale 1 is configured to be rotatable about the rotation axis 2. A plurality of marks that form an encoder pattern (not shown) are radially arrayed on the scale 1.

Although not illustrated, the scale 1 has a structure in which non-transmissive marks 1b are located as reference marks, and transmissive marks 1a, first semi-transmissive marks 1c, and second semi-transmissive marks 1d serving as code marks are arrayed between the non-transmissive marks 1b, thereby embedding absolute codes. The transmittances of the transmissive marks 1a, the non-transmissive marks 1b, the first semi-transmissive marks 1c, and the second semi-transmissive marks 1d can be set to, for example, 60%, 5%, 40%, and 20%, respectively. Then, the transmissive mark 1a can represent "2", the first semi-transmissive mark can represent "1", and the second semi-transmissive mark can represent "0".

Figure 13:
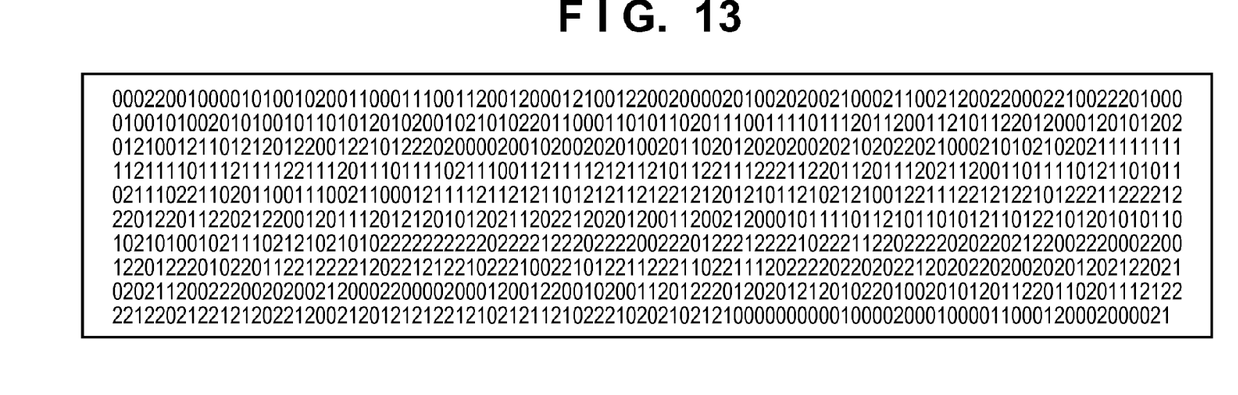
FIG. 13 is a view showing an example of a code sequence representing the absolute codes of the absolute rotary encoder according to the fourth embodiment.
Figure 14:
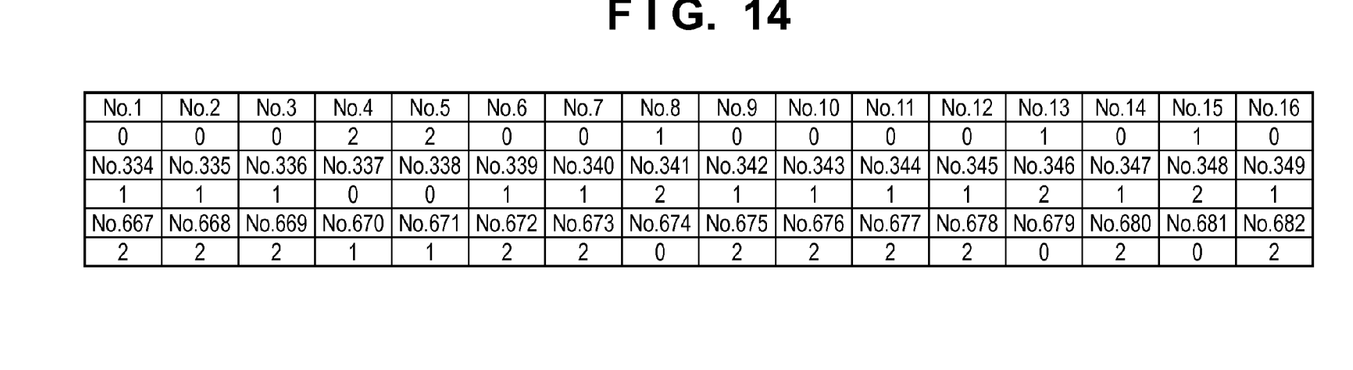
FIG. 14 is a view showing an example in which codes are located so as to obtain a constant sum of codes at the positions of three-fold rotational symmetry on the scale in the code sequence representing the absolute codes according to the fourth embodiment.

A code sequence shown in FIG. 13 includes three values 0, 1, and 2. The codes are arrayed such that a periodic signal having a predetermined amplitude is obtained by adding three periodic signals obtained from three photoelectric conversion element arrays 5a to 5c and having a change in the grayscale. In this embodiment, the code sequence is created such that all sums of three codes at the positions of three-fold rotational symmetry with respect to the rotation center of the scale 1 become 3 based on the above-described correspondence relationship between codes and transmittances. To always obtain a predetermined correspondence relationship in the three photoelectric conversion element arrays 5a to 5c, the number of pulses needs to be a multiple of 3, and is set to 999 here. In the example of 999 pulses, when the first to 333rd codes are defined as area 1, the 334th to 666th codes are defined as area 2, and the 667th to 999th codes are defined as area 3, the sum of corresponding codes of the areas is 3. If three or more photoelectric conversion element arrays exist, as in this embodiment, codes at corresponding positions are not uniquely determined, unlike the first to third embodiments, and there exist several combinations. Here, for example, when a code in area 1 is 0, a corresponding code in area 2 is 1, and a corresponding code in area 3 is 2. When a code in area 1 is 1, a corresponding code in area 2 is 2, and a corresponding code in area 3 is 0. When a code in area 1 is 2, a corresponding code in area 2 is 0, and a corresponding code in area 3 is 1. The codes of the code sequence shown in FIG. 13 are numbered No. 1, No. 2, No. 3, . . . from the first code. FIG. 14 shows an example of codes No. 1 to No. 16, codes No. 334 to No. 349, and codes No. 667 to No. 682. The code sequences shown in FIG. 14 also form 16-bit cyclic codes. That is, in this code sequence, all code sequences of 16-bit consecutive codes do not have the same code sequence.

Figure 15A:
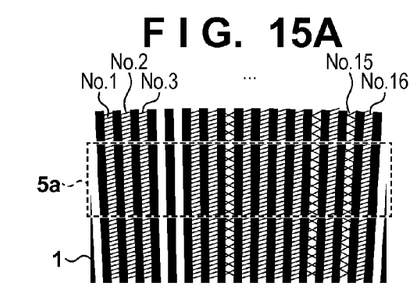
FIGS. 15A to 15H are schematic views showing the arrangement of the detector of the absolute rotary encoder according to the fourth embodiment and output signals.
Figure 15B:
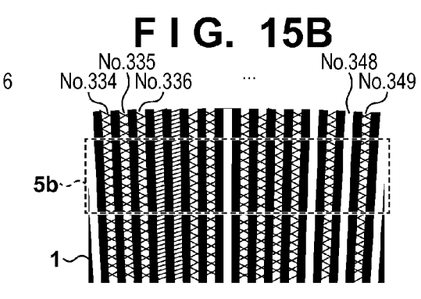
Figure 15C:
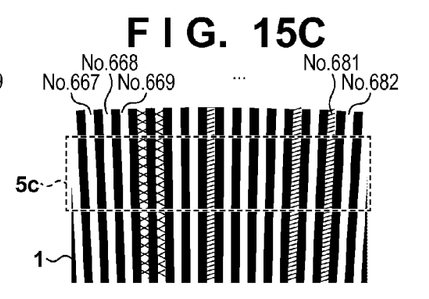

FIGS. 15A, 15B, and 15C are views showing the relationship between the scale 1 and the photoelectric conversion element arrays 5a to 5c of the absolute rotary encoder according to the present invention. FIG. 15A is a view showing a state in which codes No. 1 to No. 16 of the code sequence shown in FIG. 14 are read by the photoelectric conversion element array 5a. FIG. 15B is a view showing a state in which codes No. 334 to No. 349 of the code sequence shown in FIG. 14 are read by the photoelectric conversion element array 5b. FIG. 15C is a view showing a state in which codes No. 667 to No. 682 of the code sequence shown in FIG. 14 are read by the photoelectric conversion element array 5c. The white, black, cross-hatched, and hatched portions in FIGS. 15A, 15B, and 15C represent the transmissive marks 1a, the non-transmissive marks 1b, the first semi-transmissive marks 1c, and the second semi-transmissive marks 1d, respectively. The photoelectric conversion element array 5a is divided into light-receiving elements (not shown) which are referred to as Ch1, Ch2, . . . , Ch192 sequentially from the left side. For the photoelectric conversion element array 5b as well, the light-receiving elements are referred to as Ch1, Ch2, . . . , Ch192.

Figure 15D:
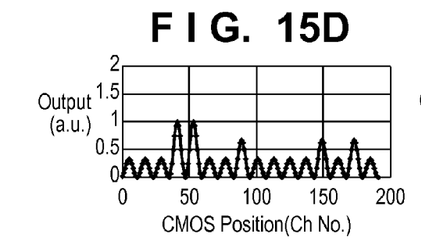
Figure 15E:
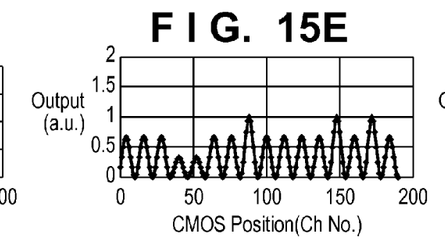
Figure 15F:
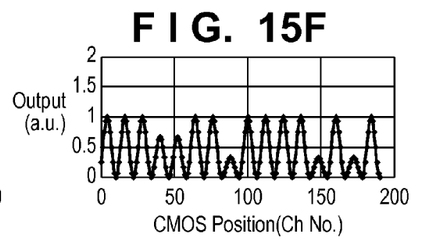
Figure 15G:
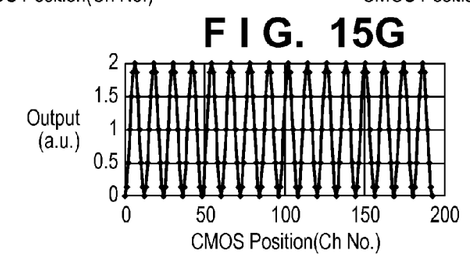
Figure 15H:
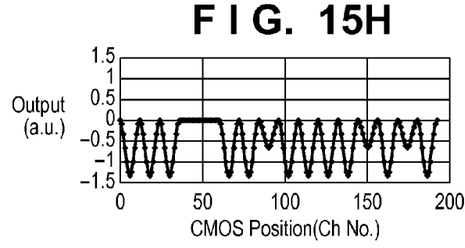

FIGS. 15D, 15E, and 15F are views showing output signals reflecting a light amount distribution 6 output from the photoelectric conversion element arrays 5a, 5b, and 5c, respectively. Ch numbers of the photoelectric conversion element array are plotted along the abscissa, and the values of the output signal reflecting the light amount distribution are plotted along the ordinate. The code sequence shown in FIG. 14 includes codes located at the positions of three-fold rotational symmetry on the scale 1 in accordance with the above-described rule. Hence, in FIGS. 15D, 15E, and 15F, periodic signals having a change in the grayscale reflecting the information of the absolute codes are output. The waveform data shown in FIG. 15D will be referred to as waveform data a, the waveform data shown in FIG. 15E will be referred to as waveform data b, and the waveform data shown in FIG. 15F will be referred to as waveform data c. FIG. 15G shows data (a+b+c) obtained by adding the waveform data a, b, and c for each Ch. In this embodiment, since there are three photoelectric conversion element arrays, several combinations are considerable when subtracting waveform data as in the first to third embodiments. For example, the waveform data b and c are subtracted for the waveform data a for each Ch. FIG. 15H shows the difference data (a−b−c). When the waveform data a, b, and d are added, a periodic signal having a predetermined amplitude is obtained, as shown in FIG. 15G. As shown in FIG. 15H, in the difference signal, the difference between the grayscales representing codes 2, 1, and 0 is twice as large as the output signals shown in FIGS. 15D, 15E, and 15F. This indicates that the robustness of the code determination signal is improved by the simple subtraction. Signal processing of the signal obtained as shown in FIG. 15G can be performed as in the first embodiment. Signal processing of the signal obtained as shown in FIG. 15H can be performed as in the third embodiment.

Thresholds used for code determination and codes to be determined by the thresholds are decided based on the correspondence relationship between codes and transmittances, the location relationship of codes on the scale 1, and the method of combining the data that have undergone subtraction. In this embodiment, as the relationship between codes and transmittances, 60% is set for a value "2", 40% is set for a value "1", and 20% is set for a value "0", as described above. As the location relationship of codes, when a value in area 1 is "0", a corresponding value in area 2 is "1", and a corresponding value in area 3 is "2". When a value in area 1 is "1", a corresponding value in area 2 is "2", and a corresponding value in area 3 is "0". When a value in area 1 is "2", a corresponding value in area 2 is "0", and a corresponding value in area 3 is "1". In the subtraction step, the waveform data b and the waveform data c are subtracted from the waveform data a for each Ch. Hence, three types of amplitudes are obtained by subtraction. The smallest value represents that the value in area 1 is 0, the second smallest value represents that the value in area 1 is 1, and the largest value represents that the value in area 1 is 2. Hence, the thresholds are decided so as to allow these amplitudes to be discriminated, and a value to be determined by the thresholds is also decided.

Figure 16:
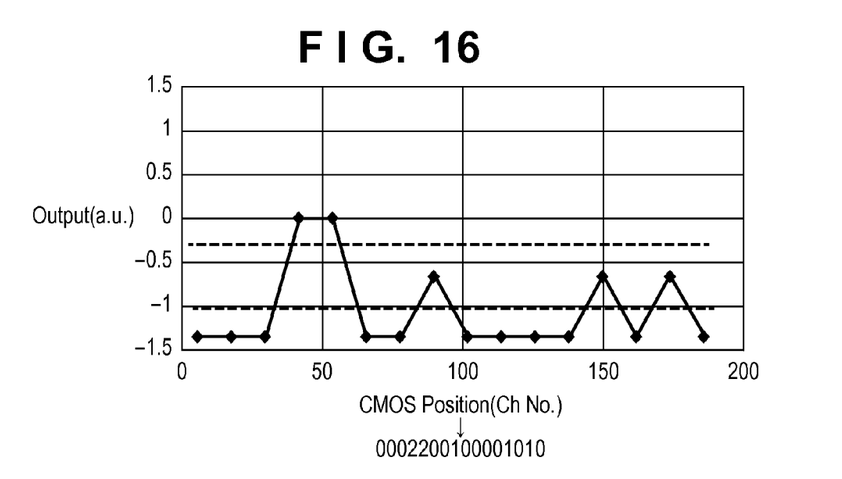
FIG. 16 is a graph showing an example of absolute code determination according to the fourth embodiment.

FIG. 16 is a graph that enlarges the code determination data shown in FIG. 15H. When two thresholds indicated by the dotted lines in FIG. 16 are set, three types of code determination data can be obtained. The code determination result is 0002200100001010. As described above, even with the arrangement including three photoelectric conversion element arrays, an accurate absolute rotary encoder having an arrangement of light calculation load can be implemented. In the fourth embodiment, the three photoelectric conversion element arrays 5 are located at the positions of three-fold rotational symmetry with respect to the rotation axis 2. However, a plurality of photoelectric conversion element arrays 5 including four or more arrays may be located at the positions of multi-fold rotational symmetry with respect to the rotation axis 2.

Other Embodiments

In the above embodiments, some of the transmissive marks 1a are replaced with the semi-transmissive marks 1c based on the incremental pattern of the transmissive marks 1a and the non-transmissive marks 1b of the scale 1, thereby embedding absolute codes by locating the transmissive marks 1a and the semi-transmissive marks 1c. However, the absolute codes may be embedded by locating the non-transmissive marks 1b and the semi-transmissive marks 1c. In the above embodiments, as an example of the transmissive marks 1a, the non-transmissive marks 1b, and the semi-transmissive marks 1c, the transmittance is changed. However, the transmissive marks 1a and the non-transmissive marks 1b may be formed by changing the area of the transparent portion, for example, by making the hatching or grating narrow or wide.

In the above embodiments, an arrangement of a transmissive encoder is employed. However, an arrangement of a reflective encoder may be employed. In the reflective type, based on the incremental pattern of reflective marks and non-reflective marks of the scale 1, which reflect light in different amounts, some of the reflective marks may be replaced with semi-reflective marks. In the above embodiments, an example in which a diverging optical system using a point light source is employed has been described. However, an arrangement using parallel light or converging light using a lens may be employed. In this case, since the relationship between the pitch of the pattern on the scale 1 and the pitch of the light amount distribution on the photoelectric conversion element array 5 may be different from that in the above embodiments, the pattern pitch and the size of the photoelectric conversion element array 5 are appropriately selected.

In the above embodiments, the number of divisions of the photoelectric conversion element array 5 is N=12. This is because components of third and higher orders can be removed in a case where the sinusoidal waveform of a signal includes a harmonic distortion component, and this is needed to execute accurate phase calculation. However, the number N of divisions other than 12 may be employed in consideration of the necessary accuracy and the availability of the photoelectric conversion element array 5. An example in which the processor P executes phase calculation and absolute position calculation in parallel, as shown in FIG. 6, has been described. However, these processes may be executed serially. For example, a procedure of performing phase calculation first and then calculating the peak value of a signal from the obtained phase information and determining codes may be employed.

Figure 17:
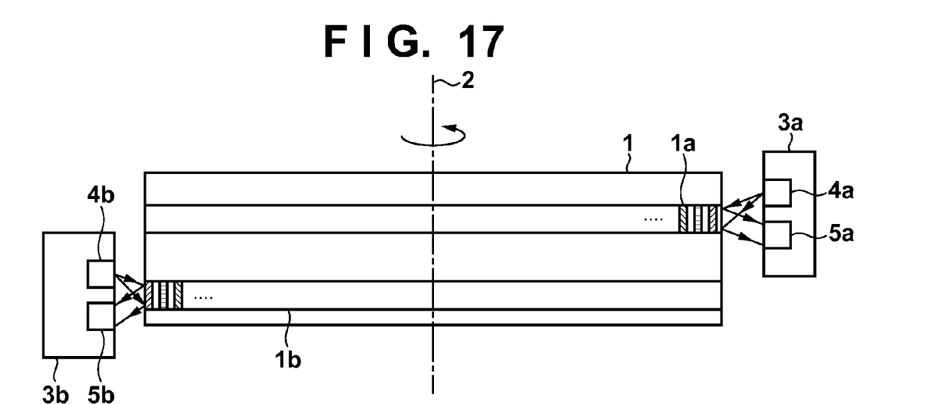
FIG. 17 is a schematic view showing an absolute rotary encoder in which a scale is formed on the cylindrical surface of a cylindrical member.

In the above embodiment, an example in which one array of encoder pattern is radially arrayed on the scale 1 has been described. However, as shown in FIG. 17, a plurality of arrays of encoder patterns 1a and 1b may be located at an interval on the cylindrical surface 1 of a cylindrical member in a direction parallel to the axis 2. In the example shown in FIG. 17, the two photoelectric conversion element arrays 5a and 5b detect signals modulated by the encoder patterns 1a and 1b on the cylindrical surface, respectively. In the above embodiments, an example in which the two photoelectric conversion element arrays 5 are placed at the positions of 180° rotational symmetry or an example in which three photoelectric conversion element arrays are placed at the positions of three-fold rotational symmetry has been described. However, the arrangement that places the plurality of photoelectric conversion element arrays 5 at the positions of rotational symmetry may be regarded as one unit, and a plurality of units may be placed. In the above embodiments, an example in which cyclic codes of a pseudo-random number sequence are employed as absolute codes has been described. However, a so-called synchronization sequence that sequentially locates absolute codes and a code representing the start of the codes as one set may be used.

With the arrangement according to the present invention, even if dust or a flaw occurs on part of the pattern located on the scale 1, following error processing can be performed. For example, assume that a flaw occurs in pattern No. 1 out of the pattern shown in FIG. 5A, and the amplitude of the signal received by the photoelectric conversion element array 5a equals that of the semi-transmissive marks. At this time, the signal obtained by adding the waveform data a and b is not a periodic signal having a predetermined amplitude. A fluctuation tolerance may be provided for the amplitude of the signal obtained by addition, and if the amplitude deviates from the fluctuation tolerance, an error signal may be output.

Figure 18:
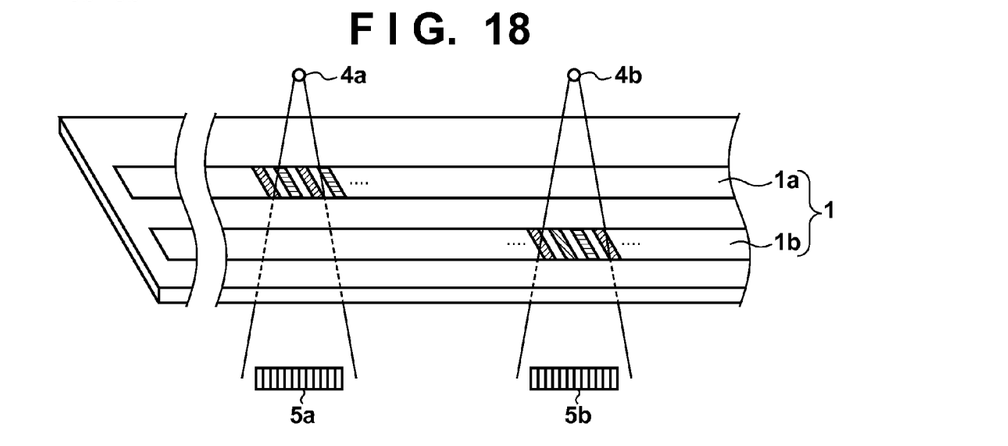
FIG. 18 is a schematic view showing an absolute linear encoder.

In the above embodiments, an absolute rotary encoder using the optical detecting device 3 has been described. However, the present invention is also applicable to a magnetic absolute rotary encoder using a scale 1 formed by providing a magnetic material on the outer surface of a rotating drum and forming S- and N-poles at a predetermined interval by magnetization, and an MR sensor that detects a change in a magnetic field from the scale 1. The present invention is also applicable to an absolute linear encoder including a plurality of detectors 5a and 5b located at an interval, and a plurality of arrays of scales 1a and 1b each including a plurality of types of marks arrayed on a plate along a line, as shown in FIG. 18. In this case, the plurality of types of marks are located on the scale 1 such that the sum of signal strengths modulated by two marks located on the scale 1 at the same interval as that of the two detecting devices becomes constant.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-136215, filed Jul. 1, 2014, which is hereby incorporated by reference herein in its entirety.

What is claimed is:

1. An absolute encoder comprising:
   a scale on which a plurality of marks including a plurality of types of marks are arrayed at a pitch with a gap therebetween, the plurality of marks including a first mark group having an associated first code sequence and a second mark group having an associated second code sequence, the first code sequence and the second code sequence having a complementary relation where the second code sequence is an inverted code sequence of the first code sequence;
   a first detecting device configured to detect the first mark group of the plurality of marks;
   a second detecting device configured to detect the second mark group of the plurality of marks, wherein the second mark group is different from the first mark group; and
   a processor configured to obtain position information based on outputs of the first and second detecting devices by:
      generating a sum signal of a first signal based on a detection result by the first detecting device and a second signal based on a detection result by the second detecting device, wherein the sum signal is a periodic signal with a fixed amplitude;
      obtaining first position data based on at least one of the first and second signals;
      obtaining second position data having a resolution higher than that of the first position data based on a phase of the periodic signal; and
      generating data representing the position information based on the first position data and the second position data.

2. The encoder according to claim 1, wherein each of the first and second detecting devices detects consecutive n marks different from each other as the first and second mark groups, respectively, and the plurality of marks are arrayed on the scale such that a sum of first and second signals with respect to an ith mark (i is one of 1, 2, . . . , n) of the first and second mark groups becomes constant irrespective of a value of i.

3. The encoder according to claim 1, wherein the processor is configured to obtain the first position data by quantizing a difference signal obtained of the first and second signals.

4. The encoder according to claim 1, wherein the scale is located on a rotating member having an axis and includes the plurality of marks arrayed around the axis, and the processor is configured to obtain a rotation angle as the position information.

5. The encoder according to claim 4, wherein the rotating member comprises a disc, and a plurality of detecting devices including the first and second detecting devices are respectively located at positions of multi-fold rotational symmetry with respect to the axis.

6. The encoder according to claim 4, wherein the rotating member comprises a cylindrical member, the scale includes the plurality of marks on a cylindrical surface of the cylindrical member, and a plurality of detecting devices including the first and second detecting devices are respectively located at positions of multi-fold rotational symmetry with respect to the axis.

7. The encoder according to claim 1, wherein the scale includes the plurality of marks arrayed along a line, and the processor is configured to obtain a position along the line as the position information.

8. The encoder according to claim 1, wherein each of the plurality of detecting devices includes a photoelectric conversion element array.

9. The encoder according to claim 8, wherein each of the first and second detecting devices is configured to detect light transmitted through the mark group.

10. The encoder according to claim 9, wherein the plurality of marks include a plurality of types of marks whose transmitted light amounts are different from each other.

11. The encoder according to claim 8, wherein each of the first and second detecting devices is configured to detect light reflected by the mark group.

12. The encoder according to claim 11, wherein the plurality of marks include a plurality of types of marks whose reflected light amounts are different from each other.

13. The encoder according to claim 1, wherein the processor is configured to output a signal representing an error based on an amplitude of the periodic signal with respect to each period of the periodic signal.

14. The encoder according to claim 1, wherein the first position data indicates an absolute position.

15. The encoder according to claim 1, wherein the processor is configured to obtain the second position data using the sum signal as the periodic signal.

* * * * *